United States Patent Office 2,796,291
Patented June 18, 1957

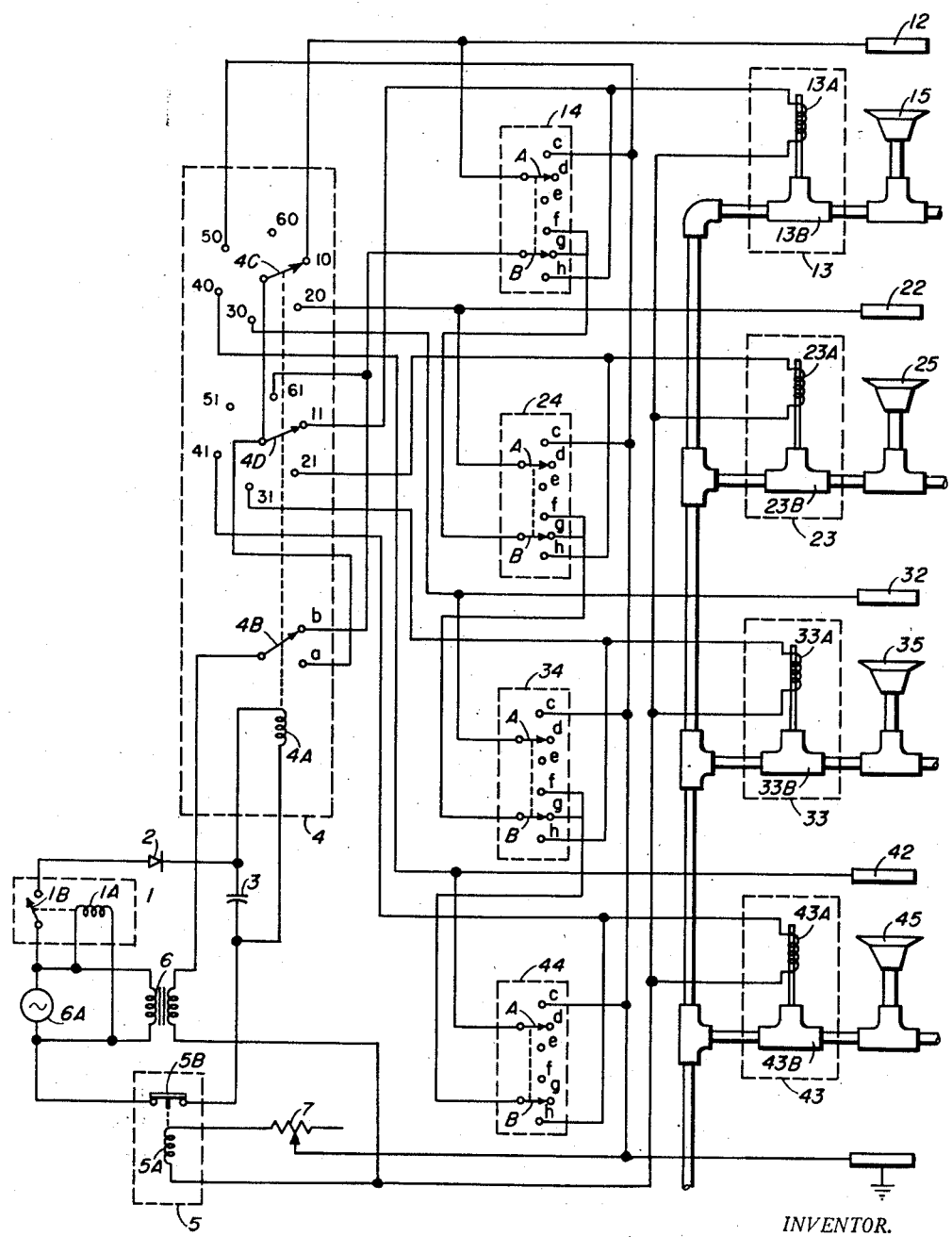

2,796,291
MOISTURE ACTUATED SOIL SPRINKLING CONTROL

Richard A. Mueller, San Diego, Calif.

Application February 20, 1956, Serial No. 566,724

6 Claims. (Cl. 299—25)

This invention relates to an electrically operated device which automatically controls the sprinkling or irrigating of soil according to the need of the soil for moisture. This invention further relates to electrically operated control apparatus for actuating a multiplicity of sprinkler lines in sequence with each line being actuated in accordance with the moisture need of the soil in the region it serves.

An object of this invention is to provide an electrical means for determining the moisture content of soil.

Another object of this invention is to provide electrical means for turning on sprinklers or other irrigating systems when the moisture content of the soil has been determined to be below a selected critical value and to turn said soil watering means off when the moisture measuring means determines that the flow of water has been sufficient to bring the moisture content of the soil up to the selected critical value.

A further object of this invention is to provide electrical means such that when the region watered by one sprinkler line of a multiline system has been determined to have sufficient moisture, not only will the flow of water to that region through its line be stopped, but other regions will be checked in sequence for the sufficiency of the moisture in the soil in those regions and the flow of water to each begun and terminated in succession according to the moisture content of the soil in those regions as determined by the individual moisture measuring means provided for each region.

These and other objects and advantages of this invention will become apparent to those skilled in the art to which it relates from the following detailed description when considered with the drawing which comprises a schematic representation of a preferred form of the invention.

Since the pressure and flow of water available is usually insufficient to permit watering an entire lawn, garden, or orchard at one time, it becomes necessary to water portions of the whole in sequence. To do this the sprinkling or irrigating system is divided into separate lines, each supplying the need of a portion of the whole region to be watered. It is customary, and generally most economical, to cover as large an area with each separate line as can be effectively supplied by the pressure and flow of water available. The electrically operated automatic soil sprinkling control of this invention determines the need for further moisture in the region served by each separate line in a multiple line system and controls the flow of water to each in succession according to the measured need. Thus, the plants in each region are assured of the water they require, but wasteful overwatering is prevented. A clock controlled switch can be used to send the system through its cycle of checking moisture content and watering each line as needed at whatever times and with whatever frequency may be desired.

The advantages and unique features of this automatic sprinkling control can best be illustrated by describing a typical sequence of operations as the control goes through one complete cycle:

The control clock being set to check the system every morning at six o'clock, the moisture measuring probe for the first sprinkler line automatically checks at that time and finds that a moisture deficiency exists. Therefore, the valve controlling the first line is opened automatically and water is permitted to flow to make up the deficiency. At 6:22 a. m. the moisture measuring probe for this line determines that sufficient water has flowed to erase the deficiency which existed. The system then closes the valve controlling the flow of water to the first sprinkler line and immediately thereafter checks the moisture content of the soil in the region served by the second sprinkler line. Determining that there is sufficient moisture at that line, the system immediately and automatically steps on to the third sprinkler line. Similarly, checking the third line the system determines that a moisture deficiency exists and so turns on the flow of water to that line. At 7:05 a. m. the moisture measuring probe for the third sprinkler line determines that the flow of water has now been sufficient to make up for the moisture deficiency which existed and therefore the system automatically shuts off the flow of water to that line and immediately thereafter goes on and checks the fourth sprinkler line. There being no moisture deficiency at the fourth line and this exemplary system being a four sprinkler line installation, the entire system has now been checked so the control remains dormant until six o'clock the next morning when each of the four lines in the system is checked once again.

The accompanying figure shows the unique means and methods utilized in my invention to accomplish the completely automatic watering cycle described above. Referring to that drawing, numeral 1 designates a switch timer clock of a type now readily available on the open market. In particular, numeral 1A refers to the clock motor and numeral 1B refers to the single pole single throw normally open switch within the timer clock which is automatically closed by the clock mechanism at regular intervals for a selectable duration of time. Since the system will go into its automatic cycle each time the clock switch is closed, the frequency of closure may be in accordance with the requirements of a particular installation, but in most cases once every twenty-four hours will probably be found to be most satisfactory. Since the system will shut off and all watering will cease when this switch opens, the duration of switch closure is adjustable so as to permit the selection of a time appropriate to the needs of the particular installation. In general, although the duration of the watering cycle is not a fixed quantity, ample time should be allowed for the system to water all lines should they require it during any one cycle.

Numeral 2 designates a current rectifier and numeral 3 designates a capacitor. Both of these components are of a type in such widespread use as to require no description of their construction or operation.

Numeral 4 designates a direct current operated stepping relay of the step-on-deenergize type which is readily available on the open market. Specifically, numeral 4A is the relay coil, numeral 4B is a single pole double throw switch, while numeral 4C and numeral 4D are each single pole multiple throw switches. In operation current flowing in sufficient magnitude through the relay coil, 4A, creates a magnetic field causing movement of the relay armature which actuates the blade of switch 4B to transfer it from contact with terminal $b$ to contact with terminal $a$. The movement of the relay armature also cocks the relay stepping mechanism but does not in any way actuate switch 4C or 4D at this time. When current flow to relay coil 4A is cut off, the magnetic field collapses releasing the armature. The stepping mechanism then drives the armature back causing the blade of switch 4B to return to contact with terminal *b* and causing the blades of switches 4C and 4D to step one position, as, for example, from terminal 10 to terminal 20 on switch 4C and from terminal 11 to terminal 21 on switch 4D.

Numeral 5 designates a sensitive A. C. relay also of a type which is freely available on the market. In particular, numeral 5A is the sensitive relay coil, and numeral 5B is a single pole single throw switch. Switch 5B is closed when the relay coil is deenergized, open when the coil is energized.

Numeral 6 designates a 115 volt to 24 volt A. C. step down transformer of a type which is freely available on the open market. Its purpose is to step down to 24 volts those portions of the circuit which involve insulated conductors buried in the earth. This lower voltage presents no hazards, as would the 115 volts, to anyone who might inadvertently cut through such a conductor while working in the soil.

Numeral 6A designates a conventional 115 volt, 60 cycle per second A. C. power source.

Numeral 7 designates an ordinary variable resistor of a type widely available throughout the country. This resistor serves to adjust the level of moisture which the system maintains in the soil, a large value of resistance resulting in the maintenance of a high level of moisture, whereas a smaller value of resistance results in a somewhat lower level of moisture being maintained.

Numerals 12, 22, 32, and 42 designate moisture sensing probes, one of which is associated with each sprinker line in the system. Each probe may consist of a single electrode or of several electrodes electrically connected together. These electrodes may be, for example, a solid or hollow cylinder or plate made of any good conductor of electricity whose surface conductivity is not extensively impaired by the corrosive effects of being buried directly in the earth for an indefinite period of time. While precious metals such as platinum and gold excel in these characteristics, carbon is also highly acceptable. The function which the probes perform in the system is not really characteristic of the probes themselves but rather of the interface between the probes and the earth in which they are buried. The resistance to current flow at this interface is an inverse function of the amount of water which is present at that interface. The water acts much in the same way as a solder which is used to fuse conductors together in a low resistance connection. Thus, somewhat indirectly, the probes provide a means for determining the moisture content of the soil in which they are buried. A probe consisting of electrodes buried near the surface of the soil will cause the associated sprinkler line to water quite frequently for short periods of time. This is because the surface layer of earth will dry out relatively quickly from evaporation but will be the first to benefit when the sprinklers are turned on. A probe consisting of electrodes buried deeply in the earth, on the other hand, will cause the associated sprinkler line to water for long periods of time with long intervals in between. This is because the soil well below the surface will be much slower in drying out and will not benefit from the sprinklers being turned on until the water has had time to trickle slowly through the soil down to the level at which the electrodes are buried. A probe which consists of some electrodes near the surface and others buried deeply in the soil will cause a combination of the above described effects. When the soil is moist down deep but dry on the surface, the shallow electrodes will exercise control. But when the surface is wet with the soil down deep dry, the deep electrodes will dominate. By locating electrodes at various depths watering for a duration of time just long enough to care for the deepest dry level can be assured.

Numerals 13, 23, 33, and 43 designate solenoid operated water valves of a type available from a large number of manufacturers throughout the country. Specifically, 13A, 23A, 33A, and 43A are the solenoid coils, and numerals 13B, 23B, 33B, and 43B are the water valves which the solenoids actuate. The valves are closed to the flow of water when their solenoid coils are deenergized, open when the solenoids are energized.

Numerals 14, 24, 34, and 44 each designate a double pole three position lever switch which is readily available from numerous manufacturers. In the A section of each switch the switch blade in the up position makes contact with terminal *c*, in the center position with terminal *d*, and in the down position with terminal *e*. In the B section of each switch the switch blade contacts terminal *f* in the up position, terminal *g* in the center position, and terminal *h* in the down position. There is one of these switches for every sprinkler line in the system. Each switch will normally be in its center position since this is the position that results in the automatic cycle of events which has been described. The up position is used only when it is desired, for some reason, that the sprinkler line associated with that particular switch shall receive no water as the system goes through its automatic cycle regardless of the findings of the moisture sensing probe for that line. The down position, on the other hand, is for the purpose of turning on the associated sprinkler line immediately regardless of the time of day or existing conditions of moisture.

Numerals 15, 25, 35, and 45 indicate the sprinkler heads for the first, second, third, and fourth sprinkler lines respectively. While only one head is shown in the drawing for each line, there will in practice generally be numerous such heads controlled from each valve.

The above components are connected together in a functioning circuit as follows:

Clock motor winding 1A of switch timer clock 1 is connected directly across the power source, 6A, a conventional 115 volt, 60 cycle per second A. C. supply. One side of timer switch 1B is connected to one side of the same power source, 6A, while the other side of switch 1B is connected to one side of rectifier 2. The other side of rectifier 2 is connected to one side of capacitor 3 and also to one side of coil 4A of stepping relay 4. The other side of capacitor 3 and the other side of stepping relay coil 4A are both connected to one side of switch 5B of sensitive relay 5. The other side of switch 5B is connected back to the other side of the common power source, 6A.

The primary side of transformer 6 is connected directly across the 115 volt, 60 cycle per second power source, 6A. One side of the secondary of transformer 6 is connected to the blade of switch 4B of stepping relay 4. Terminal *a* of switch 4B is connected to the blade of switch 4C and to the blade of switch 4D both of stepping relay 4. Terminals 10, 20, 30, and 40 of switch 4C are connected respectively to the blade of the A section of lever switches 14, 24, 34, and 44 and to moisture sensing probes 12, 22, 32, and 42. The *c* terminal of the A section of each of switches 14, 24, 34, and 44 is connected to the grounded side of variable resistor 7. Terminals 11, 21, 31, and 41 of switch 4D are connected respectively to the *h* terminal of the B section of lever switches 14, 24, 34, and 44 and to one side of solenoid coils 13A, 23A, 33A, and 43A of solenoid operated water valves 13, 23, 33, and 43. The other side of coils 13A, 23A, 33A, and 43A are connected back to the other side of the secondary of transformer 6. This side of the secondary of transformer 6 is also connected to one side of variable resistor 7. The other side of variable resistor 7 is attached to a good ground such as one of the water pipes which feeds the sprinkling system.

Terminal *b* of switch 4B of stepping relay 4 is connected to the blade of the B section of lever switch 14. Terminals *f* and *g* of the B section of switch 14 connect to the blade of the B section of lever switch 24. Terminals *f* and *g* of the B section of switch 24 connect to the blade of the B section of lever switch 34. Terminals *f* and *g* of the B section of switch 34 connect to the blade of the B section of lever switch 44.

The operation of this invention is as follows:

At a preselectable time switch 1B of switch timer clock 1 closes and feeds power from the source to coil 4A of stepping relay 4 through rectifier 2 and switch 5B of sensitive relay 5, switch 5B being closed since relay 5 is, as yet, not energized. Rectifier 2 permits only a pulsating direct current flow from the A. C. source and capacitor 3 smooths the pulsations to provide the direct current required by the stepping relay. This current flow actuates the stepping relay causing the blade of switch 4B to move from terminal b to terminal a. As a result current is then permitted to flow from the secondary of transformer 6 through switch 4B to terminal a and thence to the blade of switch 4C and the blade of switch 4D where the current divides between two parallel circuits. In one branch current flows through switch 4D to terminal 11, from terminal 11 to coil 13A of solenoid operated water valve 13, and through coil 13A back to the secondary of transformer 6. This current flow energizes solenoid coil 13A to turn on solenoid operated water valve 13 and permit water to flow to the first sprinkler line in the system. In the other branch, current flows through switch 4C to terminal 10, from terminal 10 to moisture sensing probe 12 and thence through the earth back through the ground connection to variable resistor 7, through variable resistor 7 to coil 5A of sensitive relay 5, and through coil 5A back to the secondary of transformer 6. If the resistance at the interface between probe 12 and the earth is of sufficient magnitude, due to the dryness of the soil, such that, in combination with the resistance of variable resistor 7, it limits the current flow in the branch to a value insufficient to actuate sensitive relay 5, switch 5B remains closed causing stepping relay 4 to remain energized with switch 4C still in contact with terminal 10 and thus the solenoid of water valve 13 to remain energized and the valve to remain open to the flow of water. At any time, however, that the moisture in the earth surrounding probe 12 is sufficient to reduce the interface resistance to the point where current flow in the branch becomes of sufficient magnitude in coil 5A to actuate sensitive relay 5, switch 5B will open breaking the flow of current through coil 4A of stepping relay 4. This will cause the stepping relay, since it is of the step-on-deenergize type, to step switch 4C from terminal 10 to terminal 20 and switch 4D from terminal 11 to terminal 21. With switch 4D no longer in contact with terminal 11 the flow of current through coil 13A of water valve 13 is broken causing the valve to close and cut off the flow of water to the first sprinkler line.

Similarly, with the blade of switch 4C in contact with terminal 20 and the blade of switch 4D in contact with terminal 21 current is fed through moisture sensing probe 22 and coil 23A of solenoid operated water valve 23. If the current flow through probe 22 and sensitive relay coil 5A is sufficient to actuate sensitive relay 5, switch 5B will open to cause the stepping relay to step on to the next sprinkler line. Thus, while coil 23A of water valve 23 will have been energized when the stepping relay stepped switch 4D to terminal 21, the action of the current flow through probe 22 and coil 5A will be so fast that the solenoid controlled water valve will be turned off in just an instant after it was turned on. Thus, essentially no water will have been fed to the second sprinkler line in accordance with the sufficiently high moisture content found to exist by probe 22.

The action for the succeeding sprinkler lines in the system is exactly the same as that which has just been described for the first two lines. However, since stepping relays are not readily obtainable in any desired number of contact positions, but rather in just a few standard sizes, it is probable that in many installations there will be more contact positions on the stepping relay than there are sprinkler lines to be connected into the automatic installation. The manner in which such excess relay positions are handled is illustrated by the connection to terminal 50 of switch 4C of the stepping relay. When the fourth sprinkler line has had sufficient water, the stepping relay is caused to step the blade of switch 4C in the manner which has just been described. In this position current flows from the secondary of transformer 6 through switch 4B to terminal a, from there to the blade of switch 4C and on to terminal 50. Since terminal 50 is tied directly to ground, the current flows back through the variable resistor 7 to the other side of the secondary of the transformer. In comparison with the corresponding circuit for the active sprinkler lines it is seen that this circuit differs only in that the moisture sensing probe is replaced by a short circuit. With the interface resistance of a probe lacking in series with the coil 5A of sensitive relay 5 the current is always of sufficient magnitude to actuate that relay causing switch 5B to open with the result that stepping relay coil 4A is deenergized and the relay steps on to the next position at terminal 60 on switch 4C.

It will be noted from the drawing that there is no connection to terminal 60. In this position just the reverse situation exists from that which was just described at terminal 50. At terminal 50 a short circuit or the equivalent of a zero resistance probe existed with the result that the stepping relay invariably and immediately stepped through that position. But at terminal 60 an open circuit or the equivalent of an infinite resistance probe always exists. Thus, current can never flow to actuate the sensitive relay and cause the stepping relay to step on to the next position. As a result the stepping relay remains in this position until switch 1B of switch timer clock 1 opens with the result that the flow of current through coil 4A of stepping relay 4 is interrupted and the relay, being of the step-on-deenergize type, steps to its starting position with switch 4C in contact with terminal 10 and switch 4D in contact with terminal 11. But with switch 1B open, the stepping relay remains deenergized with switch 4B closed to terminal b rather than to terminal a. This prevents current from flowing to either solenoid coil 13A or to probe 12 until the next time that the clock mechanism closes switch 1B at which time the entire cycle is repeated.

One of the characteristics of this circuit which make it a preferred embodiment of this invention is its so-called fail-safe manner of operation. If the sprinkler heads which water the vicinity in which the moisture sensing probe for a particular line is buried should become obstructed, or should the wire to the probe in some manner become severed, the resistance in the probe circuit might well never be lowered to the point where the sensitive relay would be actuated to cause the stepping relay to step to the next sprinkler line. Accordingly, water would continue to flow to the unobstructed sprinkler heads in the defective line, whereas subsequent lines would be prevented from receiving water they might need. However, should this condition occur, when switch 1B of switch timer clock 1 opened, the stepping relay would be deenergized and caused to step one position. Thus, flow of water to the defective line would be cut off and the next time switch 1B were closed by the clock mechanism the system would complete the interrupted cycle commencing with the first sprinkler line after the defective one. In this way the flow of water to a defective line is held to within reasonable limits and the remaining lines in the system are very nearly assured of all the water they require as soon as they require it.

As has been pointed out, lever switches 14, 24, 34, and 44 have three positions of which the center position leads to the functioning which has been described. If any one of these switches is closed in the up position, it causes the sprinkler line with which it is associated to be bypassed when the system goes through its automatic cycle just as though the moisture sensing probe for that line had indicated that no further moisture was needed. This is brought about by the fact that with the switch in the up position section A makes contact with terminal c, bypassing the moisture sensing probe with a short circuit to ground. Thus, just as was the case with terminal 50 which was tied to ground, there will be sufficient current flow immediately to actuate sensitive relay 5 and cause the stepping relay to step on to the next position without watering the bypassed line.

On the other hand, when any one of lever switches 14, 24, 34, or 44 is closed in the down position, the corresponding sprinkler line is turned on immediately without regard to either the time of day or conditions existing at the moisture sensing proble for that line, provided only that the system is not in the midst of its automatic cycle. In the period between cycles stepping relay 4 is deenergized since timer clock switch 1B is open. Accordingly, switch 4B of stepping relay 4 is closed to terminal b. Thus, electrical potential is fed from one side of the secondary of transformer 6 through switch 4B to terminal b and on to the blade of the B section of lever switch 14. If switch 14 is in either the up or the center position, electrical potential will be fed on through to terminals f and g, which are tied together, and thence to the blade of the B section of switch 24. If switch 24 is in either the up or the center position, contact will be made either to the f or g terminal of that switch section and electrical potential will be fed through to the blade of the B section of switch 34. In a similar manner, if switch 34 is in either the up or the center position, electrical potential will be fed to the blade of the B section of switch 44. However, if any one of these switches is thrown to the down position, potential will be fed instead to terminal h of the B section of that switch and thence on to the coil of the corresponding solenoid operated water valve. Since the circuit is closed from there back to the secondary of transformer 6, current will flow to energize the valve and permit the flow of water. It should be noted also that when one lever switch is thrown to the down position to contact with terminal h instead of f or g, power is cut off from all subsequent switches making it impossible to turn on the sprinkler lines associated with those switches. Thus, it is impossible to turn on more than one sprinkler line at one time. Since each sprinkler line is presumably loaded to the full extent consistent with the ability of the water source to supply water, it would result in improper watering were two or more lines to be turned on simultaneously. It is, accordingly, good design to make such abuse of the system impossible. Furthermore, since there is no need for two solenoid operated water valves to be energized at the same time, it would be uneconomical design to use a transformer which had more than enough current carrying capacity to supply one valve at a time. A transformer of capacity to supply only one valve, then, would burn out if two or more valves were turned on for any reason whatsoever for any considerable period of time. Thus, the characteristic which permits only one sprinkler line at a time to be turned on is a safety feature which prevents improper watering and damage to the components of the control apparatus.

Variable resistor 7, in series with the common return of each moisture sensing probe back through the ground to the secondary of transformer 6, serves as a sensitivity adjustment to control the level of moisture which the system maintains in the regions served by the various sprinkler lines. Turning the control on variable resistor 7 so as to increase its effective value of resistance in the circuit tends to decrease the magnitude of current flowing in coil 5A of sensitive relay 5. This, then, works against actuating relay 5 and as a consequence also against causing stepping relay 4 to step to the next position. To overcome this it is necessary for water to flow in the sprinkler line in question more frequently so as to maintain the moisture level at the moisture sensing probe at a sufficiently high level so that the interface resistance will be low enough in value to overcome the increased resistance of variable resistor 7. Thus, increasing the effective resistance of variable resistor 7 causes the system to maintain a higher moisture level in the soil, and conversely, decreasing the effective resistance of variable resistor 7 causes the system to maintain a lower moisture level in the soil. All sprinkler lines are affected equally by changes in variable resistor 7. If it is desired to have independent control over the moisture level maintained by each sprinkler line, a separate variable resistor control can be inserted in series with each individual prove. Fixed differences between the moisture levels maintained by different lines may be accomplished by varying the size of the moisture sensing probes for those lines. Thus, if it is desired to maintain the first sprinkler line at a moisture level higher than the average for the system, and the moisture level for the second line at a value lower than the average for the system, the moisture sensing probe for the first line should be made smaller than the average sized probe and the moisture sensing probe for the second line should be made larger than the average for the system. In making the probe for the first line smaller than average, the area of the interface contact with the soil will be decreased and thus the interface resistance will be increased to cause the system to maintain the higher moisture level for that line just as the higher value for variable resistor 7 caused a higher moisture level to be maintained. Similarly, with the second sprinkler line the larger moisture sensing probe will give a larger than average area of interface contact with the soil with a resulting lower value of interface resistance. This lower value of resistance at the probe will cause the system to maintain the moisture level at that line at a lower value for the same reason just described that a lower value of resistance in variable resistor 7 will cause a lower moisture level to be maintained.

While a particular embodiment of this invention has been described in detail, it is of course understood that there is no desire to limit the invention to the exact details described for it will be obvious to those skilled in the art that many modifications and variations are possible within the scope of the following claims.

What is claimed is:

1. In a moisture actuated soil sprinkler control, a stepping switch circuit including an open-close switch and stepping switch actuating means therein, said stepping switch actuating means being operable upon actuation of said open-close switch, a transformer having the primary thereof connected in parallel with said stepping switch circuit for connection with a source of electrical energy, a valve actuating circuit for controlling the flow of water and a moisture sensing circuit connected in parallel to the secondary of said transformer, said moisture sensing circuit including switch opening means for actuating said open-close switch and variable resistance means lessening in resistance with increase in moisture thereabout, said valve actuating circuit including electromechanical means for opening a valve to release moisture near said variable resistance means.

2. In a moisture actuated soil sprinkler control as in claim 1, said variable resistance means comprising a single electrically conducting probe embedded in the ground in proximity to sprinkling means controlled by said electromechanical operated valve, the interface between said probe and the ground forming a resistance to current flow therethrough inversely proportional to the moisture content of said interface.

3. In a moisture actuated soil sprinkler control as in claim 1, a plurality of valves each actuated by electromechanical means and each having a moisture sensing element associated therewith, stepping switches for sequentially connecting said plurality of electromechanical means and said moisture sensing elements to said secondary, said stepping switch actuating means stepping said stepping switches upon opening of said open-close switch to connect the next one of said electromechanical means and moisture sensing circuits in sequency to said secondary, said switch opening means being energized when the resistance in said moisture sensing circuit is sufficiently low to permit energization thereof.

4. In a moisture actuated soil sprinkler control as in claim 1, means including a hand operated switch for short circuiting said variable resistance means in said moisture sensing circuit to thereby provide less resistance in said moisture sensing circuit, thereby energizing said switch opening means independently of the resistive value of said variable resistance means.

5. In a moisture actuated soil sprinkler control as in claim 1, means for opening said valve when desired, said means comprising a second electrical path including a hand operated switch for energizing said electromechanical actuated valve.

6. In a moisture actuated soil sprinkler control as in claim 1, means for opening said valve when desired, said means comprising a second electrical path including a hand operated switch for energizing said electromechanical actuated valve and siwtching means normally connecting said second path to said secondary.

References Cited in the file of this patent

UNITED STATES PATENTS

| | | |
|---|---|---|
| 2,318,969 | Reynolds | May 11, 1943 |
| 2,578,981 | Parker | Dec. 18, 1951 |
| 2,599,862 | Ray | June 10, 1952 |
| 2,695,976 | Hasenkamp | Nov. 30, 1954 |